(12) United States Patent
Arai

(10) Patent No.: US 7,555,823 B2
(45) Date of Patent: Jul. 7, 2009

(54) PRODUCTION LINE

(75) Inventor: Shigehiro Arai, Chiba (JP)

(73) Assignee: Seiko Instruments Inc. (JP)

( * ) Notice: Subject to any disclaimer, the term of this patent is extended or adjusted under 35 U.S.C. 154(b) by 411 days.

(21) Appl. No.: 11/177,703

(22) Filed: Jul. 8, 2005

(65) Prior Publication Data

US 2006/0104751 A1 May 18, 2006

(30) Foreign Application Priority Data

Aug. 6, 2004 (JP) .............................. 2004-230571
Jun. 16, 2005 (JP) .............................. 2005-176281

(51) Int. Cl.
*B23P 23/00* (2006.01)
*B23Q 41/00* (2006.01)

(52) U.S. Cl. .............................. 29/563; 29/560; 483/15

(58) Field of Classification Search .................. 29/33 P, 29/563, 33 S, 33 D, 33 T, 560, 564; 198/345.3, 198/346.1; 409/172, 159; 483/15
See application file for complete search history.

(56) References Cited

U.S. PATENT DOCUMENTS

| | | | | |
|---|---|---|---|---|
| 3,154,979 A | * | 11/1964 | Crispin | 29/34 B |
| 3,484,944 A | * | 12/1969 | Pryshlak | 384/57 |
| 3,729,083 A | * | 4/1973 | Wollenhaupt et al. | 29/563 |
| 3,835,527 A | * | 9/1974 | Cornair | 29/560 |
| 4,034,465 A | * | 7/1977 | Shelton | 483/1 |
| 4,218,815 A | * | 8/1980 | Cumming | 29/563 |
| 4,783,889 A | * | 11/1988 | Hayashi | 29/33 P |
| 5,361,486 A | * | 11/1994 | Harmsen et al. | 29/563 |
| 5,657,529 A | * | 8/1997 | Bohn et al. | 29/563 |
| 6,192,572 B1 | * | 2/2001 | Azema | 29/564 |
| 6,478,722 B1 | * | 11/2002 | Graham et al. | 483/28 |
| 6,519,831 B2 | * | 2/2003 | Futamura et al. | 29/564.7 |

FOREIGN PATENT DOCUMENTS

| | | | | |
|---|---|---|---|---|
| JP | 01-275908 A | * | 11/1989 |
| JP | 2001-121386 A | * | 5/2001 |
| JP | 121386-PAJ | | 5/2001 |
| JP | 2002-370142 A | * | 12/2002 |
| JP | 370142-PAJ | | 12/2002 |

* cited by examiner

*Primary Examiner*—Erica E Cadugan
(74) *Attorney, Agent, or Firm*—Adams & Wilks

(57) ABSTRACT

A production line comprises production devices arranged in a line for machining a workpiece by conveyance of the workpiece successively to the production devices. Each of the production devices has a machine for machining the workpiece, an individual base for supporting the machine, a mounting unit that removably integrally mounts the machine on a surface of the individual base, and a positioning/moving unit that positions the machine on the surface of the individual base and that facilitates sliding movement of the machine along the surface of the individual base to permit the machine to be slidingly drawn off of the surface of the individual base when the machine is not mounted on the surface of the individual base by the mounting unit. The line unit also comprises a maintenance stand onto which the machine slidingly drawn off of the surface of the individual base is placed for transportation away from the production line and/or for undergoing a maintenance operation.

18 Claims, 10 Drawing Sheets

PRODUCTION LINE

BACKGROUND OF THE INVENTION

1. Field of the Invention

The present invention relates to a production line for machining a workpiece by conveying the workpiece successively to a plurality of production devices arranged in a line.

2. Description of the Related Art

In production lines of this kind, for the purposes of changing a workpiece, performing maintenance on individual production devices, making improvements and changes to the production process, etc., the production devices are interchanged or moved out of the production line for maintenance as required. Of the production devices constituting the production line, machine tools used for cutting, grinding, or the like usually weigh on the order of several tons; as for their sizes, those machines are typically as large as 800 mm in width and 2,500 mm in depth at the minimum.

Therefore, equipment such as a crane is required for interchanging the machines, which in turn requires a large working space and a large amount of manpower, resulting in poor efficiency. Further, the production line must be stopped during the interchanging or maintenance operation; since the interchanging of the machines itself is a rather large-scale operation, the production line is stopped for a long period of time, often more than one day.

With conventional machine tools, it is possible to secure a working space inside the machines because the machines themselves are large. However, due to the miniaturization of machines in recent years, it is impossible to secure a sufficient working space inside machines, resulting in an increase in the time required for the replacement or adjustment of parts, so increasingly longer time is required in total for retooling.

Instead of providing an additional space inside the machines, the area around the machines is often utilized as the working space. However, in cases where the machines are integrated into a production line, it is necessary to provide a large spacing between the machines in order to secure a requisite working space, so the production line increases in length and the space efficiency deteriorates.

In view of this, there are various known inventions aimed at facilitating the maintenance or interchanging of production devices such as machine tools that are arranged at a narrow spacing. In JP 2002-370142 A, individual main body machines (beds, headstocks, or X-Y tool tables) are made common to one another, and a separate modular unit (tool spindle) is provided for each of the machines, thereby facilitating changes to the production process.

In JP 2002-370142 A, however, it is necessary to provide a working space for maintenance between the machines, so the line length cannot be shortened when the machines are arranged close to one another.

Further, in JP 2001-121386 A, R-type machine tools and L-type machine tools, in which an apparatus group requiring maintenance is collectively located on the right-hand and on the left-hand side, respectively, of the machine tool main body, are arranged alternately, and a maintenance space is provided for each set of two machine tool main bodies by enlarging the gap through which the apparatus groups requiring maintenance are opposed back to back to each other, with the two machine tool main bodies being held in intimate contact with each other to thereby reduce the line length.

However, when changes to the production process are effected simply by interchanging part of the machines as described in JP 2001-121386 A, the freedom of changes is somewhat limited. Further, it is often necessary to change all the machines. In order to change the whole machines, the machines must be interchanged by drawing them out of the production line altogether with their machine bases.

As described above, in conventional production lines, a space allowing the maintenance or movement of the machines in and out of the production lines must be provided between the machines, resulting in such problems as increased production line length due to the space or the necessity to draw out the entire machine, which is rather heavy and bulky, from the production line altogether with their machine bases when interchanging the machines.

SUMMARY OF THE INVENTION

The present invention has been made to solve the above-mentioned problem, and therefore it is an object of the invention to provide a production line which allows easy interchange of and maintenance on production devices (machine tools, assembly machines, measurement equipment, washing devices, inspection devices, etc.) and which is compact with a short line length.

To attain the above object, according to the present invention, there is provided a production line including: a base; a plurality of machines that machine a workpiece and are arranged in a line on the base; an inter-machine workpiece conveying device that delivers the workpiece between a workpiece delivery position of one of the plurality of machines and a workpiece receiving position of another one of the plurality of machines; positioning/fixing means for positioning and fixing the machine in the line onto a top surface of the base; and moving means provided between the base and the machines, for moving the machine along the top surface of the base. To draw the machine out of the production line, first, the fixation of the machine and the base to each other by the positioning/fixing means is released. Next, a stand is prepared in advance on the aisle side such that it is in contact with the base of the production line. The movement of the machine is facilitated by the moving means, whereby the operator draws out the machine forwards and moves it onto the stand. To set the machine thus drawn out of the production line to a predetermined position on the production line, the machine on the stand is moved by the operator onto the base. At this time, the moving means facilitates this movement, and the machine is accurately positioned and fixed onto the predetermined position of the production line by the positioning/fixing means.

When the plurality of machines have a common base frame width, only the plurality of machines can be interchanged in their placement on the base, whereby changes to the production process of the production line can be readily made in a short time. It is not necessary to perform a large-scale operation such as interchanging machines of different widths to redesign the entire production line, as is the case with the prior art.

When the plurality of machines are arranged at a common spacing, a common inter-machine-body workpiece conveying device can be used for the plurality of the machines, and adjustments relating to the workpiece delivery after the interchange of the production devices can be facilitated.

When the moving means has a structure and dimensions which are common among the plurality of machines, in the case where the plurality of machines are to be interchanged and arranged arbitrarily, the interchangeability of the moving means allows the operator to draw out the machines from the base for easy interchange without making particular adjustments and the like to the moving means.

When the positioning/fixing means has a structure and dimensions which are common among the plurality of machines, in the case where the plurality of machines are to be interchanged arbitrarily, the interchangeability of the positioning/fixing means allows the operator who has interchanged the machines to readily position and fix the machines in place.

The moving means has a V-groove rail extending along a movement direction of the machines, a ball that engages with the V-groove rail, and a hydropneumatic device for urging the ball toward the V-groove rail to lift the machines from the top surface of the base. Accordingly, when drawing out the machine from the base, the machine is lifted from the top surface of the base by means of the hydropneumatic device, thus making the machine accurately movable in the draw-out direction, and when fixing the machine onto the base, the hydropneumatic device is deactivated, whereby the machine is brought into intimate contact with and fixed onto the top surface of the base.

Further, when the V-groove rail is provided on the base side, and the ball and the hydropneumatic device are provided on the machine side, the ball supports the machine on top of the maintenance stand or the like even after the machine is slidingly drawn out of the base, whereby the operator can readily move the machine.

The positioning/fixing means includes positioning means having: a V-groove rail extending along a movement direction of the machines; a ball that engages with the V-groove rail; and a stopper provided with respect to the movement direction. Accordingly, the V-groove rail and the ball serve to position the machine onto the base with respect to the direction in which the production line extends and the stopper is positioned in the draw-out direction of the machine, whereby the operator can readily perform positioning simply by pressing the machine against the stopper on the base.

The production line further includes a maintenance stand onto which the machine slidingly drawn out of the top surface of the base by the moving means is placed, the maintenance stand having a rigidity and vibration-proof property that are equivalent to those of the base. The maintenance stand includes: a machine placing surface in contact with the base and onto which the machine slidingly drawn out of a machine placing surface of the base can be directly placed; height adjusting means for adjusting leveling and height of the machine placing surface; positioning means for positioning the machine on the machine placing surface; and fixing means for fixing the positioned machine onto the maintenance stand. Accordingly, maintenance can be performed on the maintenance stand for a production device such as a machine tool in the same manner as when it is placed on the base.

When there is used, as the positioning means, a fence surrounding the machine and provided along three peripheral sides of the machine placing surface excluding a machine receiving side, it is possible to perform positioning on the drawn out machine and to prevent it from falling off at the same time, whereby the drawing out operation can be performed with safety.

The production line further includes a control device connected to the machine through a detachable cable to control activation of the machine. When drawing out the machine from the top surface of the base and placing it onto the maintenance table, the cable is temporarily detached at the attachment/detachment portion, and after the machine is placed and fixed onto the maintenance stand, the machine and the control device are connected to each other via an extension cable. Likewise, when the fluid supply device and the machine are connected to each other via a flexible extension tube, the machine can be normally operated on top of the maintenance stand without moving the control device or the fluid supply device, whereby the maintenance operation can be performed at the site while operating the machine. Upon finishing the maintenance operation, the effectiveness of the maintenance operation performed can be checked by actually operating the machine at the site.

When the positioning/fixing means has fixing means including screw-coupling means for fastening the base and the machine onto each other, the operator can readily fix the machine onto the base by screw coupling.

When the machines slidingly drawn out of the top surface of the base is placed on a maintenance stand having the same height as the base, and screw-coupling means having a structure and dimensions common to the screw-coupling means provided between the base and the machine is provided between the maintenance stand and the machine, the machine can be readily fixed onto the maintenance stand, and it is possible to ensure safe maintenance operation.

When a caster-equipped cart is used as the maintenance stand, the machine can be placed on the cart and moved to a location spaced from the production line or to a station position different from the position of the station from which the machine has been drawn out, whereby the machine can be interchanged with another station of the production line.

Further, when the caster-equipped cart is provided with a control device accommodating portion that accommodates a control device for controlling the activation of the machine, or with a fluid supply device accommodating portion that accommodates a fluid supply device for supplying a fluid to the machine, the machine, and a set of the control device or fluid supply device can be placed on the cart and moved to another location to undergo maintenance operation, to be interchanged immediately, without the maintenance operation, with a pre-adjusted spare set prepared in advance on another cart, or to be interchanged with another kind of set that has been set up in advance for changing the production process to thereby achieve the interchange with another kind of production process. The machine, and the required associated devices such as the set of control device or fluid supply device, are placed altogether on the cart, and after the wiring and piping connections with the machine are established again on the cart, are moved to a spaced location to be thereby operated as one independent production device. Accordingly, it is possible to perform maintenance by actually operating the production device or perform a check by actually machining a workpiece at the site, and further, depending on the case, to carry out the production at the site.

When the base is split into a plurality of split bases, the plurality of split bases are detachably connected to each other by connection means, and the maintenance stand is provided with connection means common to the plurality of the split bases, the maintenance stand can be used as add-on split bases, whereby it is possible to increase the number of stations in the production line even when there is no spare split base.

When the base is split into a plurality of split bases, and the plurality of split bases are detachably connected to one another by connection means, depending on the number of processes in the production line, the production line is extended if the number of processes is large, and is shortened if the number of processes is small, thereby enabling efficient utilization of a factory space. When the split bases are the same in width dimension, this enables even more effective production line organization.

Further, when the respective machine placing surfaces of the plurality of split bases are the same in height, it is possible to use a maintenance stand with a height common to all the machines, making it unnecessary to adjust the height of the maintenance stand according to the machine.

When the connection means has a structure and dimensions which are common among the plurality of split bases, the interchange or connection between the split bases is further facilitated.

When one of the plurality of machines is formed as a large machine having a base frame width larger than a standard base frame width of the other ones of the plurality of machines, and the large machine is fixed onto the base by plural ones of the positioning/fixing means provided for the machines having the standard base frame width, or when the large machine is made movable with respect to the base by plural ones of the moving means provided for the machines having the standard base frame width, the large machine can be incorporated into the production line.

Further, a machine at a first station of the production line is equipped with a bar cutting device; a bar is supplied along a workpiece principal axis and cut by the bar cutting device to produce a workpiece, which is delivered to a next production process. With this construction, it is possible to machine a bar as the raw material into a workpiece by a turning machining operation.

The present invention uses miniature machines having a width of not larger than 600 mm and a depth of not larger than 800 mm. When such miniature machines having small size and weight are used, it is extremely easy to draw them out to a narrow working aisle along the production line and to perform maintenance operation thereon at the site or by carrying them to another location, or to interchange them in order to make changes to the production process or perform a test.

The term "machining" as used herein refers not only to mechanical machining using a cutting tool, a grinding tool, or the like but also to assembling or processing such as washing, measurement, or inspection.

The term "machine" as used herein refers to the main body portion of a production device, that is, the main portion thereof that performs machining. When the production device is a machine tool, the term refers to a headstock retaining a workpiece, a tool base on which the workpiece is machined, cutting means for performing cutting between the headstock and the tool base, and the like. When the production device is a measurement device, the term refers to a workpiece retaining stand, a gauge head, means for bringing the workpiece retaining base and the guide head into and out of contact with each other, and the like. The term "machine" does not include its associated devices (such as a cutting fluid supply device, a control device, an air supply device, and a washing fluid supply device). In other words, the "machine" refers to a device which, when operated together with its associated devices, can function as an independent production device to perform a predetermined production process (such as cutting, inspection, or washing) on the workpiece.

The term "moving means" as used herein refers to means for reducing the friction between two objects, for example, a base and a machine, to thereby enable a person to readily move one object with respect to the other.

The expression "in a line" as used herein refers not only to a linear configuration but also a curved configuration such as a circular arc.

The phrase "structure and dimensions common to" as used herein refers to an arrangement in which the structures, dimensions, positions, and attitudes of a plurality of objects are common to one another, thus providing interchangeability allowing one of the objects to be interchanged with the other.

According to the present invention, in the production line in which the workpiece is successively conveyed by the inter-machine-body workpiece conveying device to the plurality of machines arranged in a line on the base, each of the plurality of machines performing predetermined machining on the workpiece, when maintenance operation such as adjustments to the machine, or tool replacement is to be performed, the positioning/fixing means provided between the base and the machine is detached to allow the operator to easily draw the machine out of the production line by the moving means, whereby maintenance operation can be quickly performed outside of the production line at a location with ample space.

After the maintenance operation, the operator can easily return the machine to the original position in the production line again by the moving means, and perform accurate positioning on the machine and fix it to that position by the positioning/fixing means, whereby the machine can be readily returned to the production line.

As a result, maintenance or interchanging operation can be performed within the working aisle of an ordinary production line. In this case, when the associated devices remaining in the production line and the machine drawn out of the production line are connected to each other through the extension cable or flexible extension tube, the machine can be operated at the drawn out position, whereby it is possible not only to perform maintenance while operating the machine but also actually machine the workpiece in order to check the effectiveness of the maintenance operation.

Further, as required, the control device and the fluid supply device can also be moved to another location while placed on the caster-equipped cart. Accordingly, a machine requiring high frequency maintenance is interchanged with a pre-adjusted spare machine prepared in advance, and setup operations for the next interchange is performed at another location. Alternatively, to change the production process, another kind of machine is setup in advance to allow quick interchange of the machines. In this way, the line operation suspension time can be significantly shortened.

Further, when changes are necessary to the production process of the production line, the machine is drawn out of the production line by the moving means, and another machine is incorporated into the production line and accurately positioned and fixed onto the base by the positioning/fixing means, whereby changes to the production process can be readily made in a short time.

Since the maintenance operation can be performed with the machine slidingly drawn out of the production line, there is no need to secure a space for the maintenance operation inside the production line, and the spacing between adjacent main body portions can be narrowed by bringing them very close to each-other, thereby making it possible to reduce the length of the production line.

DESCRIPTION OF THE PREFERRED EMBODIMENTS

Figure 1:
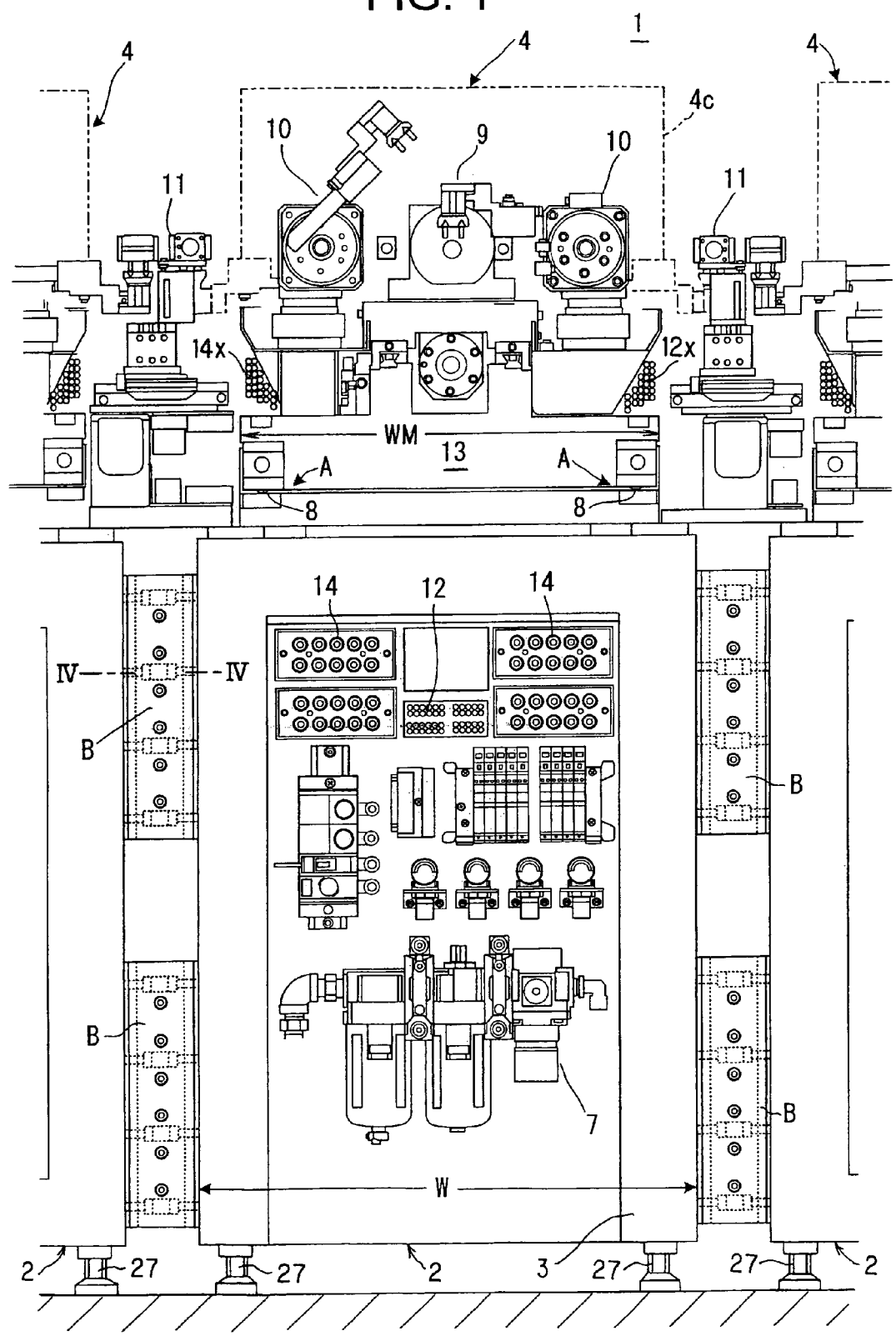
FIG. 1 is a front view showing a first embodiment of the present invention.
Figure 2:
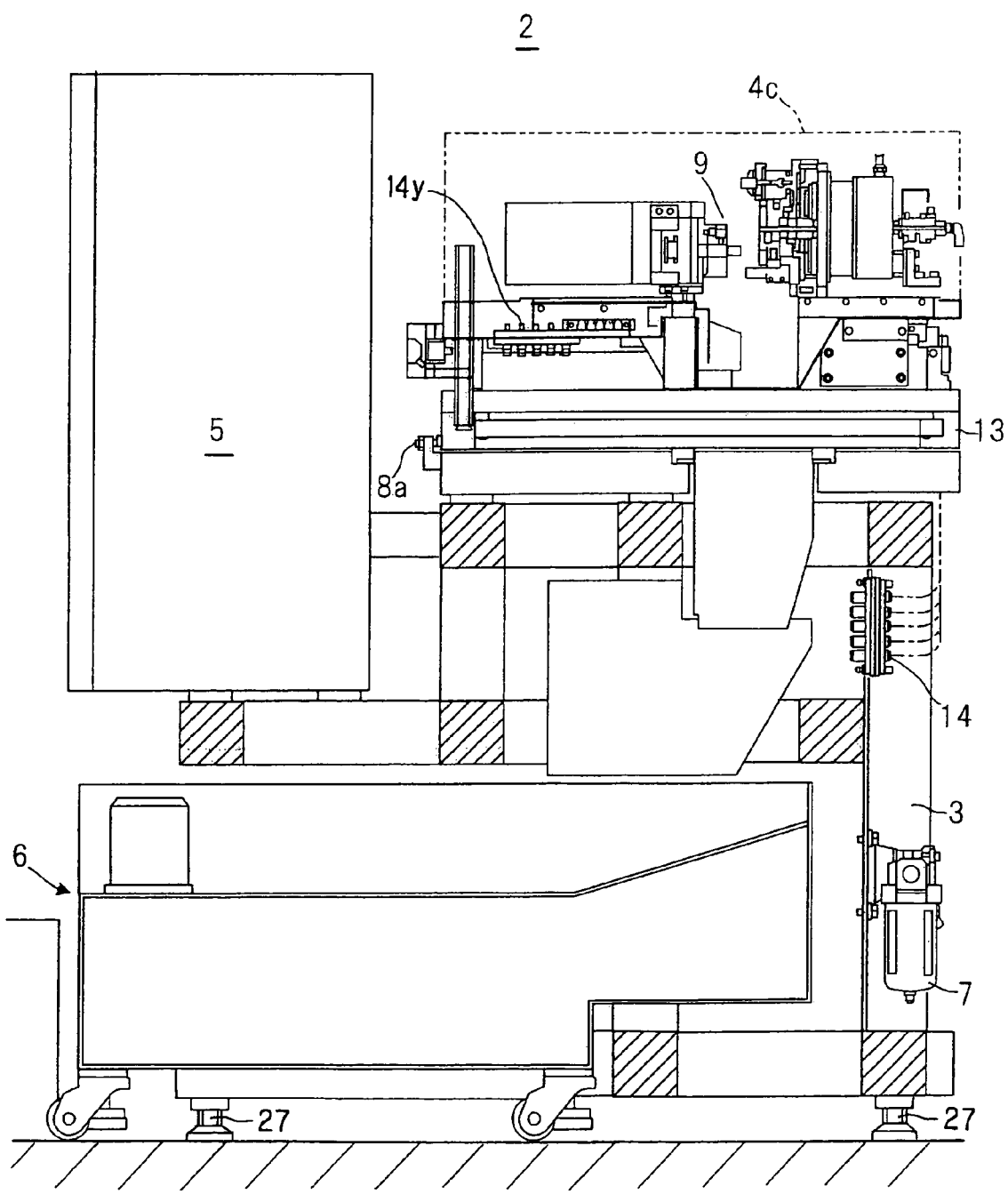
FIG. 2 is a side sectional view of FIG. 1.
Figure 3A:
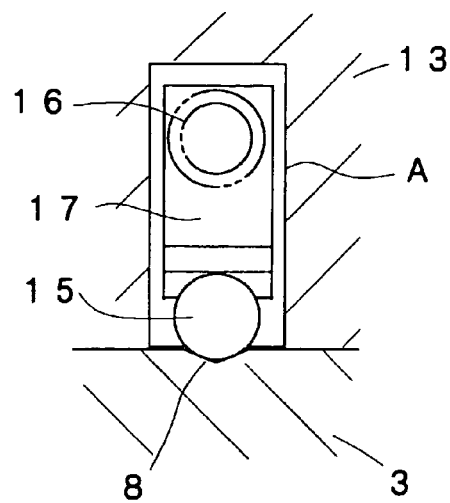
FIGS. 3A and 3B are enlarged main portion views of FIG. 1.
Figure 3B:
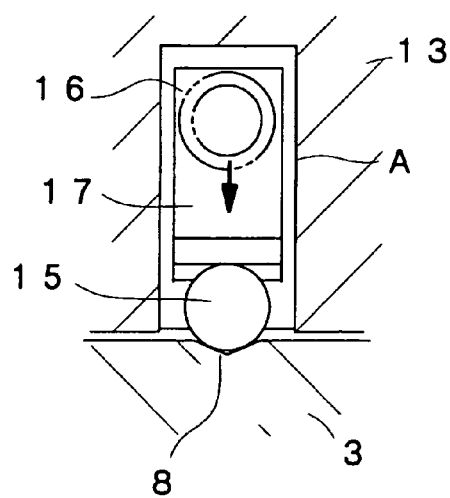
Figure 4:
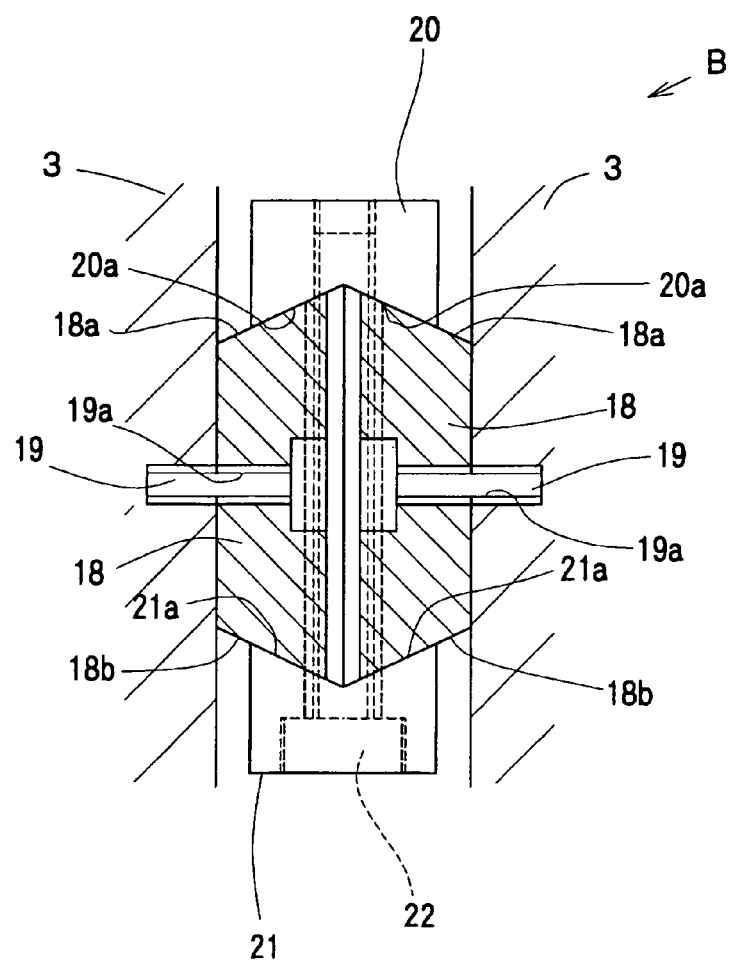
FIG. 4 is a sectional view taken along the line IV-IV of FIG. 1.
Figure 5:
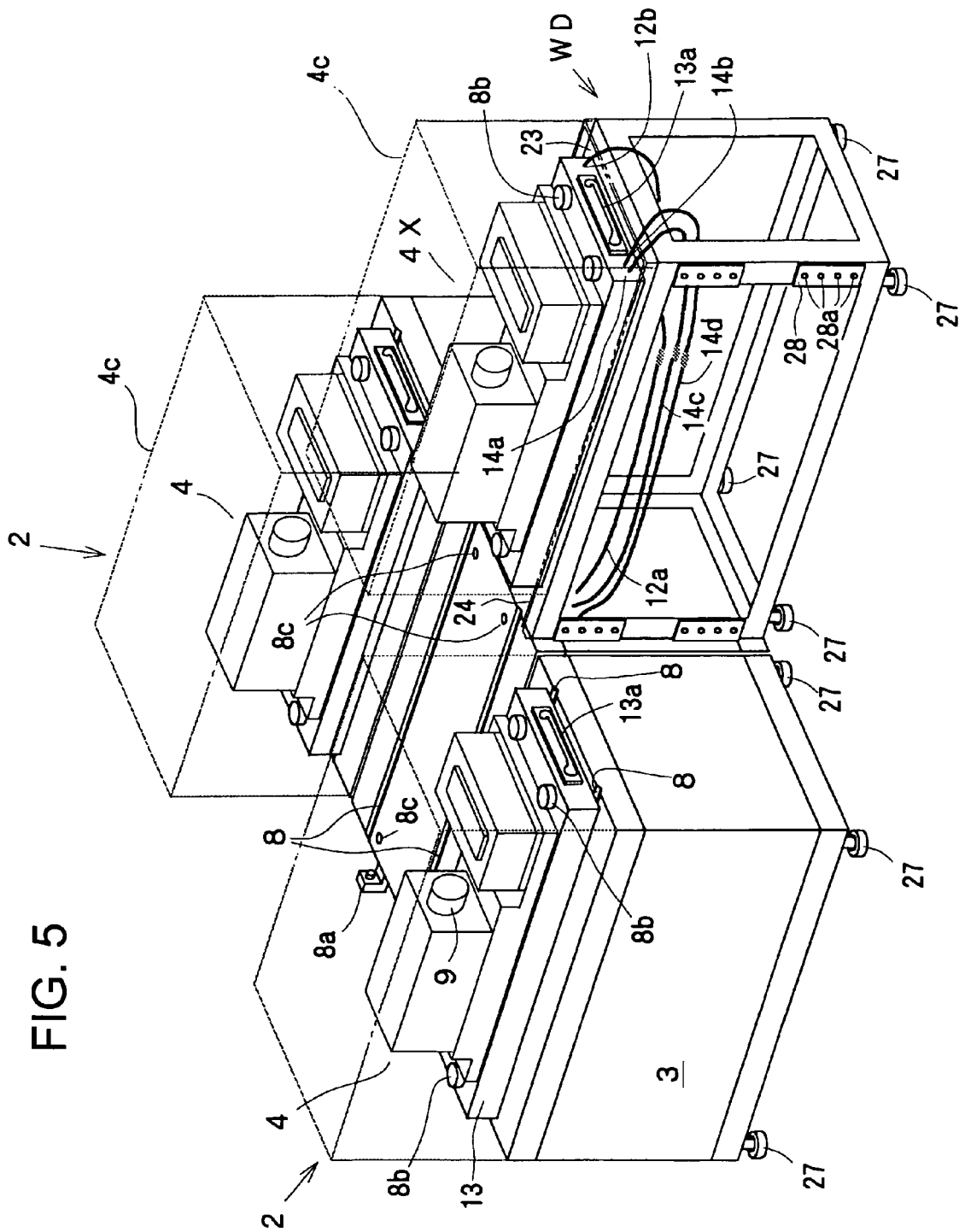
FIG. 5 is a perspective view schematically showing how maintenance operation is performed.
Figure 6:
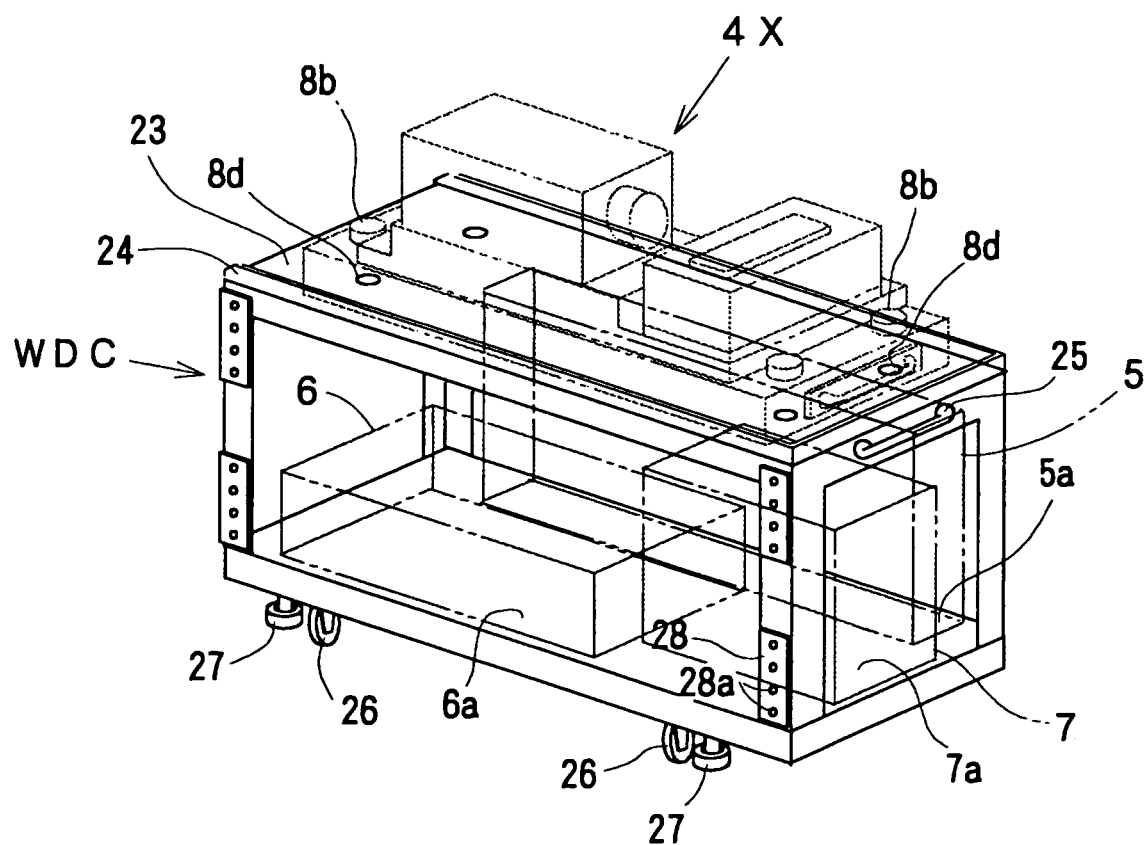
FIG. 6 is a perspective view of a caster-equipped cart.
Figure 7:
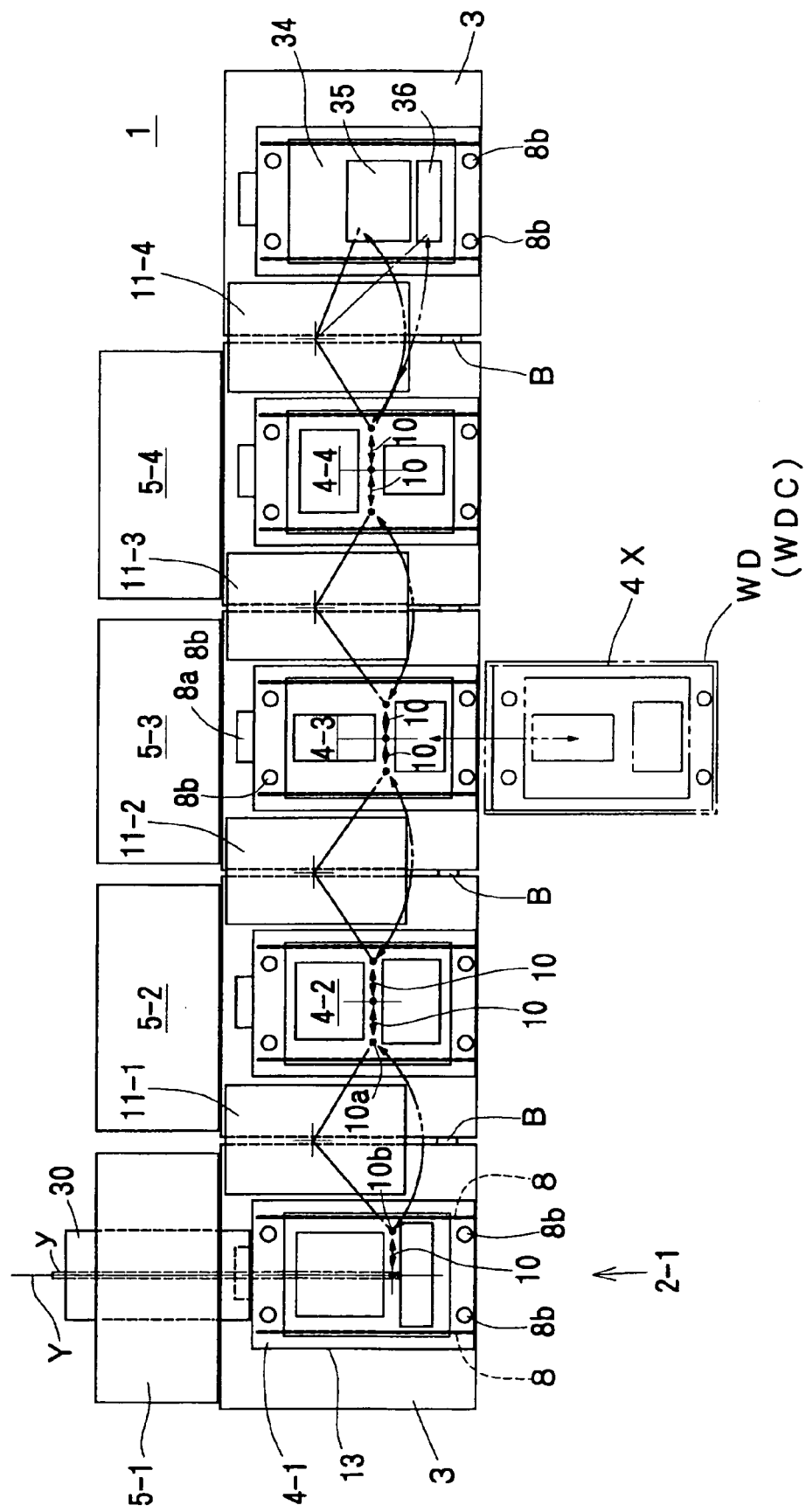
FIG. 7 is a plan view showing a second embodiment of the present invention.
Figure 10:
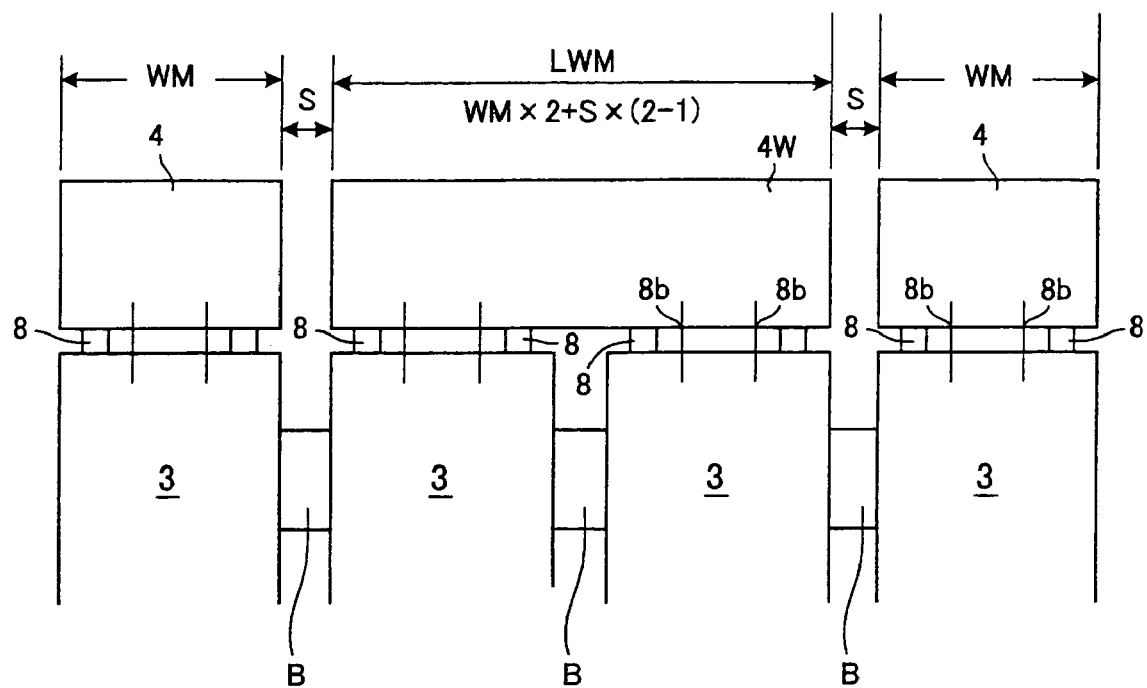
FIG. 10 is a front view schematically showing a fifth embodiment of the present invention.
Figure 11A:
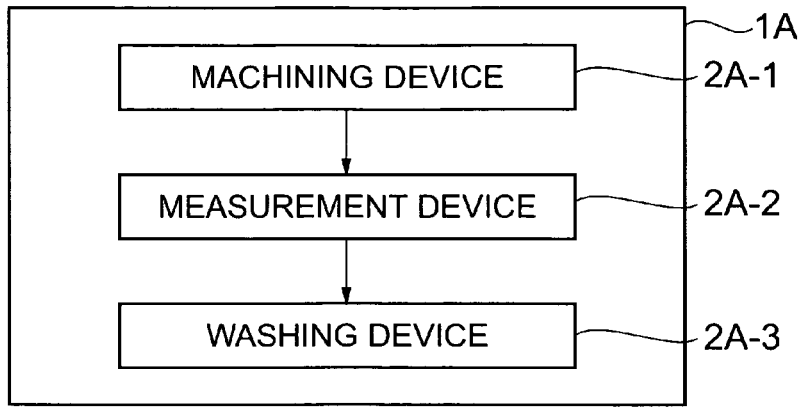
FIGS. 11A through 11C are block diagrams each showing a production process to which a production line of the present invention is applied.
Figure 11B:
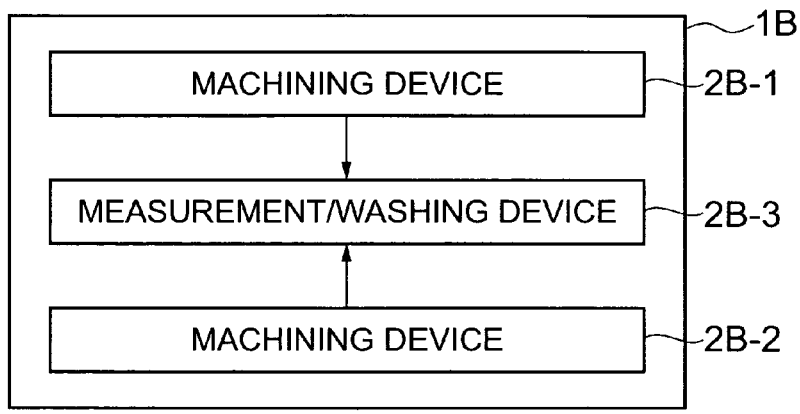
Figure 11C:
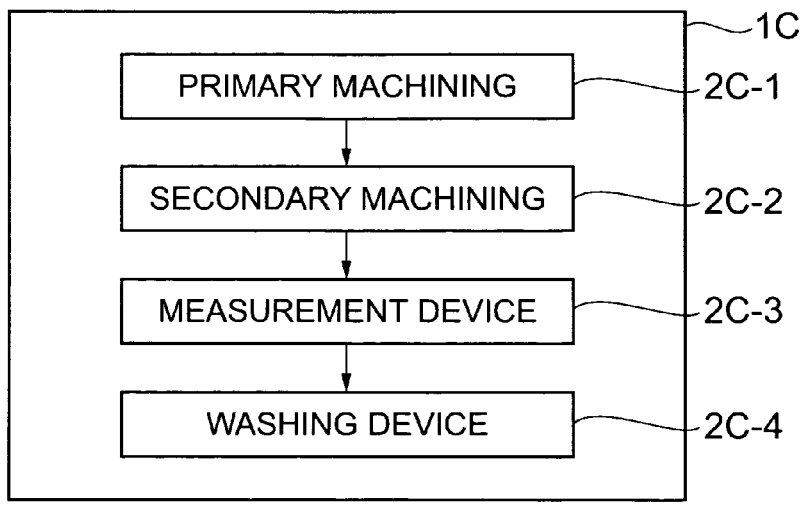

Hereinbelow, embodiments of the present invention will be described with reference to the drawings. FIG. 1 is a front view showing a station on a production line according to a first embodiment of the present invention, and stations respectively located upstream and downstream of the station. FIG. 2 is a side sectional view of FIG. 1. FIG. 3 are enlarged partial sectional views showing machine/movement-guide engaging means, of which FIG. 3A shows a disengaged state and FIG. 3B shows an engaged state. FIG. 4 is a sectional view taken along the line IV-IV of FIG. 1, showing split bases and means for mechanically connecting the split bases with each other. FIG. 5 is a schematic perspective view showing how a machine is drawn out of the production line for maintenance operation. FIG. 6 is a perspective view showing a caster-equipped cart. FIGS. 7 though 9 are plan views showing second, third, and fourth embodiments of the present invention, respectively. FIG. 10 is a front view schematically showing a fifth embodiment of the present invention. FIGS. 11A through 11C are block diagrams each showing a production process to which a production line of the present invention is applied.

First Embodiment

[Construction and Operation of the Production Line]

Referring to FIGS. 1 and 2, in a production line 1, a plurality of production devices 2, each of which is provided for each station on the production line, are arranged in a row, whereby a workpiece is machined while being successively transferred from one production device to the next. Each of the production devices 2 is composed of: an individual or split base 3 of a frame structure disposed on the floor surface; a machine 4 detachably fixed onto the split base 3; a control device 5 mounted to an upper rear surface of the split base 3; and a cutting fluid supply device (fluid supply device) 6 and an air supply device (fluid supply device) 7 which are disposed inside the split base 3.

The split bases 3 of the respective production devices 2 are mechanically connected to one another. In this embodiment, the split bases 3 are formed in uniform dimensions of 600 mm in width, 800 mm in depth, and 900 mm in height, thus having a unit module width W, a unit module depth, and a unit module length. In other words, the heights of the split bases 3, that is, the heights of the machine placing surfaces, are the same. The production devices 2 are arranged at equal pitches without spacing therebetween.

The split bases 3 are detachably connected to one another to form one base. Each of the split bases 3 has leveling pads 27 disposed at the four corners, thereby allowing adjustment of the height and leveling.

Further, the respective machines 4 of the production devices 2 are arranged in a line on the base.

As will be described later, the machines 4 perform on the workpiece respective machining processes of the production line.

When making changes to the production process of the production line, an increase or decrease in the number of processes can be effected by simply increasing or decreasing the number of split bases 3, whereby strategic production line organization can be realized without creating wasted space.

Since a width WM of the base frame (small base portion) of each machine 4 is common among a plurality of the machines, solely the plurality of machines 4 can be interchanged in their placement, whereby changes to the production process of the production line can be readily made in a short time. It is not necessary to perform a large-scale operation such as interchanging machines of different widths to redesign the entire production line, as is the case with the prior art.

Movement guides 8 each consisting of a V-groove rail are provided in an upper forward surface of the split base 3 so that the machine base body 4 can be drawn forwards out of the production line. The movement guide 8 functions as a guide when machine/movement-guide engaging means A brings the machine and the movement guide into engagement with each other, so that the undersides of a plurality of balls arranged in front of and behind the machine/movement-guide engaging means A, which will be described later, are pressed against the V-groove rail of the movement guide 8, thereby allowing the machine 4 to move lightly forwards and backwards.

During operation of the production line 1, the engagement by the machine/movement-guide engaging means A is released, and the machine 4 is fixed to the split base 3 by fastening it with four fastening members such as, for example, fixing bolts 8b (see FIG. 5). At this time also, the balls are in engagement with the V-groove rail, whereby lateral positioning of the machine 4 is effected upon fastening it with the bolts. Further, the longitudinal positioning of the machine 4 at the time of fastening it with the bolts is effected as a stopper 8a mounted on the split base 3 side comes into abutment with the rear end surface of a base frame 13 of the machine 4.

In other words, in this embodiment, the V-groove rail 8 extending along the movement direction of the machine main body 4, the balls 15 engaging with the V-groove rail 8, and the stopper 8a provided with respect to the movement direction, constitute positioning means.

Screw-coupling means is composed of the four fixing bolts 8b, screw holes 8c that are provided in an upper surface of the split base 3 and into which the fixing bolts 8b are screwed, and of bolt passage holes penetrating the machine 4. The screw-coupling means constitutes a mounting unit or fixing means common to the respective production devices in terms of its placement, dimensions, and structure. Each machine 4 is dimensioned to have a small width so that it does not interfere with the adjacent machine main body 4.

Further, the positioning means and the fixing means as described above constitute positioning/fixing means of the present invention. With the positioning/fixing means, each machine is positioned and fixed in a line onto the base surface.

Various devices are provided in the respective machines 4 in accordance with the process intended. In the case of a turning machine, for example, a headstock for retaining and rotating the workpiece, a tool base retaining a tool, a cutting fluid supply nozzle, a cutting-fluid/cutting-chips removal tub, and the like are provided. In the case of a washing device, a washing fluid supply nozzle, a washing fluid removal tub, and the like are provided. In the case of an inspection device, a workpiece retaining base, a measurement device adapted to each inspection item, and the like are provided.

All kinds of the machines 4 are each provided with two internal conveyance devices 10 for receiving a workpiece at a workpiece receiving position and delivering it to a spindle 9 or the like of the headstock at a workpiece delivery position, or for receiving a machined workpiece from the spindle 9 or the like and conveying it to the workpiece delivery position.

A device 11 for conveying a workpiece between the machines (hereinafter, referred to as the "inter-machine workpiece conveying device 11") is disposed between adjacent machines 4. The inter-machine workpiece conveying device 11 receives/delivers the workpiece to/from the internal conveyance device 10 at the workpiece receiving position or the workpiece delivery position. It should be noted that raw-material workpieces are received one by one from a supply device (not shown) at the starting end of the production line 1 and the machined workpieces are delivered into a collection box at the terminal end.

Other than being compact and consisting of a known rotary robot type transport device, each of the internal conveyance device 10 and the inter-machine workpiece conveying device 11 has no distinctive features and thus detailed description thereof will be omitted.

During operation of the production line 1, the machine 4 is fixed onto the split base 3 by the fixing means; as the internal conveyance device 10 and the inter-machine workpiece conveying device 11 act in cooperation with each other, the workpiece is successively delivered to the main body portion 1 of the production device at the adjacent station and undergoes predetermined machining within the machine 4.

The control device 5 performs the control of such conveyance and machining. The control device 5 is disposed in the rear of the split base 3 for each of the machine main body portions 4, and a signal for controlling the power for machining or conveying the machine base portion 4 is supplied to each machine via a detachable cable 12x. Reference numeral 12 denotes a cable connecting terminal on the split base 3 side. The base frame 13 of the machine 4 is similarly provided with a cable connecting terminal 12b to which the other end of the cable is connected (see FIG. 5). The detachment/attachment of the cable is performed at either of the two cable connecting terminals.

Further, in the machine 4, a cutting fluid, air used for pneumatic chuck, and the like are supplied via detachable piping 14x from fluid supply devices that are disposed for each machine 4 according to the kind of the machine 4, for example, a cutting fluid supply device 6 and an air supply device 7. Reference numeral 14 denotes a piping connecting terminal on the split base 3 side. The piping 14x is connected to the piping connecting terminal 14, whereby the cutting fluid from the cutting fluid supply device 6 and the air from the air supply device 7 are supplied-to the machine 4 via the piping. It should be noted that the base frame 13 of the machine 4 is similarly provided with piping connecting terminals 14a (for cutting fluid) and 14b (for air) see FIG. 5) to which the other end of the piping is connected. The detachment/attachment of the piping is performed at either of the two piping connecting terminals. The piping used is preferably a pressure-resistant flexible tube having a one-touch coupler attached at its both ends. It should be noted that reference symbol 14y shown in FIG. 2 denotes a piping connecting terminal disposed inside the machine 4.

Reference symbol 4c denotes a cover covering the inner portion of the machine 4 and used to prevent scattering of the cutting fluid and to ensure safety. A pulling handle 13a is attached onto the forward side of the base frame 13 of the machine 4.

FIGS. 3A and 3B illustrate how the machine/movement-guide engaging means A functions. FIG. 3A shows a state in which the machine/movement-guide engaging means A is released, and FIG. 3B shows a state in which the machine/movement-guide engaging means A is activated to lift the machine 4 from the top surface of the split base 3. In this embodiment, the "air lifted Freebear unit" manufactured by Freebear Corporation is adopted as the machine/movement-guide engaging means A. The machine/movement-guide engaging means (air lifted Freebear unit) A is provided to the base frame 13 of the machine 4 so as to extend along the V-groove rail of the movement guide 8 on the split base 3 side. The machine/movement-guide engaging means A has the balls 15 arranged at several longitudinal locations, and is adapted to supply a high-pressure fluid to an inner portion 17 of the machine/movement-guide engaging means from a high-pressure fluid supply port 16 or to discharge a high-pressure fluid from an exhaust port (not shown). That is, the inner portion 17 of the machine/movement-guide engaging means constitutes a hydropneumatic device.

In the state shown in FIG. 3A, in which a high-pressure fluid is exhausted, the balls 15 are placed on the V-groove rail of the movement guide 8. At this time, the pressure of the inner portion 17 is the atmospheric pressure, so the balls 15 do not support the base frame 13 and the base frame 13 is in contact with the top surface of the split base 3. In the state of FIG. 3A, the machine 4 can be fixed to the split base 3 by the fixing means to await the operation of the production line.

When the high-pressure fluid is supplied to the inner portion 17 via the high-pressure fluid supply port 16, the machine/movement-guide engaging means A is activated and, as shown in FIG. 3B, pushes the balls downwards. As a result, the balls 15 are brought into firm contact with the V-groove rail of the movement guide 8, and the base frame 13 is lifted by the resulting reaction force. In the lifted state, the operator can lightly draw out the machine 4 forwards in order to perform maintenance or interchange.

That is, in this embodiment, the V-groove rail 8 serving as the movement guide, the balls 15 engaging with the V-groove rail 8, and the hydropneumatic device 17 that urges the balls 15 toward the V-groove rail 8 to lift the machine 4 from the top surface of the split base 3, constitute moving means that is provided between the base and the machine and is capable of moving the machine along the top surface of the split base. It will be appreciated that the V-groove rail 8, balls 15, hydropneumatic device 17, and stopper 8a mounted on the split base 3 also constitute a positioning/moving unit that positions the machine 4 on the split base 3 and that facilitates sliding movement of the machine 4 along the split base 3 to permit the machine 4 to be slidingly drawn off of the split base 3.

The structure and dimensions of the moving means are common to the plurality of machines. When the plurality of the machines are to be arbitrarily interchanged in their placement, the interchangeability among the moving means allows the operator to readily draw out the machine from the base without making particular adjustments to the moving means.

FIG. 4 is a detailed view of connecting means B for mechanically connecting the respective split bases 3 of the production devices 2 with each other. Bosses 18 each including inclines surfaces 18a and 18b on its both sides are fixed to side surfaces of the respective split bases 3. To effect connection, the two bosses 18 are sandwiched by a screw-hole-equipped connecting member 20, which includes a concave V-shaped surface 20a that engages with the inclined surfaces 18a located on the rearward side of the opposing bosses 18, and by a bolt-passage-hole-equipped connecting member 21, which includes a concave V-shaped surface 21b engaging with the inclined surfaces 18b located on the frontward side of the opposing bosses 18, and a connecting bolt 22 is passed into the bolt-passage-hole-equipped connecting member 21 from the frontward side and then screwed into the screw-hole-equipped connecting member 20 for fastening. Due to the resulting wedge function, the bosses 18 are pulled closer to each other, thereby connecting the split bases 3 with each other.

As described above, the connecting means B is constructed so as to be detachable, and its structure and dimensions are common to the plurality of split bases. Accordingly, when the members constituting the line are to be increased or decreased in number, the separation or connection of the split bases can be performed in a short time with efficiency.

[Maintenance Operation etc.]

In the production line of the present invention, the space required for the maintenance or the interchange of the production devices is not provided between the production devices. However, the maintenance or the interchange of the production devices can be performed by a simple operation and in a short time.

FIG. 5 is a schematic perspective view illustrating how maintenance operation is performed by drawing out the machine (which in this embodiment is a machine of a machine tool) disposed in the production line, showing the split base 3 and three sets of the machines 4. Referring to FIG. 5, reference symbol 8b denotes the fixing bolts, and reference symbol 8c denotes screw holes bored at four locations in the top surface of the split base 3. Reference symbol 12a denotes an extension cable connecting between the cable connecting terminal 12 side of the split base 3 and the cable connecting terminal 12b of the machine 4. Reference symbol 13a denotes the pulling handle attached onto the frontward side of the base frame 13. Reference symbol 14c denotes a flexible extension tube connecting between the piping connecting terminal 14 (for cutting fluid) side of the split base 3 and the piping connecting terminal 14a of the machine 4, and reference symbol 14d denotes a flexible extension tube running between the piping connecting terminal 14 (for air) side of the split base 3 and the piping connecting terminal 14b of the machine 4.

Reference symbol WD denotes a maintenance stand on which the machine 4 drawn out of the production line is placed. The maintenance stand WD is a work stand that can be carried around within the working aisle of the production line. In order that, with a machine tool body portion placed on the maintenance stand WD, a test run, adjustment, and the like can be performed under the same environment as when the machine tool body is placed on top of the split base, and the equivalent machining accuracy, performance, and function can be obtained, the maintenance stand WD has a rigidity, vibration-proof property, and vibration-absorbing property equivalent to those of the split base, whereby the horizontal position of a machine placing surface 23 can be maintained. The maintenance stand WD, which has the leveling pads 27 equipped at its four corners to maintain the horizontal position, achieves horizontal leveling through adjustment of the leveling pads 27, and has substantially the same height as that of the split base, thus allowing the machine 4 drawn out, of the production line to be moved onto the top surface of the work stand WD for maintenance operation. Instead of the leveling pad, hydropneumatic lifting means such as a hydraulic jack may be used as the horizontal leveling means.

The maintenance stand WD has a fence 24 surrounding a machine 4X and provided along the three peripheral sides of the machine placing surface 23 excluding the machine receiving side. The fence 24 is provided to effect the longitudinal and lateral positioning of the machine 4X that has been drawn out and to prevent it from falling off.

Like the machine placing surface of the split base 3, the placement surface 23 of the maintenance stand WD has four screw holes for the fixing bolts 8b which are bored at four locations. After the machine 4X that has been drawn out undergoes positioning by the fence 24, the fixing bolts 8b are screwed into those screw holes for fastening, whereby the machine 4X is securely fixed onto the maintenance stand WD to be operated under the same condition as when placed on the split base 3.

Provided to both side surfaces of the maintenance stand WD is a connecting member 28 having screw holes 28a provided at the same height and position as a screw hole 19a of the above-mentioned connecting means B provided to either side surface of the split base 3. When, for example, the number of stations in the production line is to be increased but there are not enough split bases 3 at hand, the connecting member 28 can be used instead of the split base 3. In this case, the screw 19 (see FIG. 4) is screwed into the screw hole 28a, fixing the boss 18 by fastening, and then the connection and fixation to the adjacent split base 3 is effected by using the screw-hole-equipped connecting member 20, the bolt-passage-hole-equipped connecting member 21, and the connecting bolt 22 in the same manner as when connecting the split bases 3. In this way, the maintenance stand WD can also serve as the split base 3 since it has a rigidity, vibration-proof property, vibration-absorbing property, and horizontal position maintaining property equivalent to those of the split case 3.

In order for the maintenance stand WD to be carried around, the maintenance stand WD is equipped with casters, like a caster-equipped cart that will be described later.

Simple maintenance is performed according to the following procedure by using the maintenance stand WD within the working aisle of the production line.

(1) While the operation of the production line is stopped, the wiring connecting between the machine on which maintenance is to be performed and the control device, and the piping connecting between the machine and the fluid supply device are detached.

(2) The maintenance stand WD is disposed in front of the split base.

(3) The leveling pads 27 are adjusted while setting the height of the maintenance stand WD to the height of the split base.

(4) The fixing bolts 8b and the like are detached to bring the fixing means into a release state.

(5) The machine/movement-guide engaging means A is activated to lift the machine 4X slightly from the split base 3 so that the machine 4X can slide forwards along the movement guide (V-groove rail) 8.

(6) As shown in FIG. 5, the machine 4X on which maintenance is to be performed is drawn out forwards from the production line and moved onto the maintenance stand WD.

(7) Longitudinal and lateral positioning of the machine is performed with the fence 24 surrounding the three peripheral sides of the maintenance stand WD.

(8) The machine/movement-guide engaging means A is deactivated, and the machine 4X is placed on the maintenance stand WD.

(9) The machine 4A is fixed onto the maintenance stand WD with the fixing bolts 8b and the like.

(10) The cable is connected again by connecting the machine 4X to the control device 5 via the extension cable 12a, and the piping is connected again by connecting the piping connecting terminals 14a and 14b of the machine 4X to the piping connecting terminals 14 of the cutting fluid supply device 6 and air supply device 7 via the flexible extension tubes 14c and 14d.

(11) In this state, the maintenance is performed within the working aisle of the production line.

After the maintenance, the machine 4X is returned to the original position through a procedure reverse to the above procedure.

FIG. 6 is a perspective view showing a caster-equipped cart facilitating carriage. A caster-equipped cart WDC as a type of maintenance stand includes the fence 24 surrounding the machine 4X and provided along the three peripheral sides of the machine placing surface 23 excluding the machine receiving side, with a handle 25 being attached onto a side of the caster-equipped cart WDC. Bored in the machine placing surface 23 are screw holes 8d that have the same diameter as, and are arranged at the same interval as, the screw holes 8c of the split base 3. That is, between the caster-equipped cart (maintenance stand) WDC and the machine 4X, there is provided screw-coupling means of the structure and dimensions common to the screw-coupling means provided between the coupling base 3 and the machine main body portion 4.

The leg portion of the caster-equipped cart WDC is provided with a control device accommodating portion 5a accommodating the control device 5 for controlling the activation of the machine, and fluid supply device accommodating portions 6a and 7a accommodating the fluid supply devices (the cutting fluid supply device 6 and the air supply device 7) for supplying fluids to the machine.

Attached to the four bottom corners of the caster-equipped cart WDC are casters 26 and the leveling pads 27 that are the same as those shown in FIG. 5.

In the same manner as the case of FIG. 5, the connecting member 28 having the screw holes 28a is provided in either side surface of the caster-equipped cart WDC.

The maintenance and the interchange of the production devices, which take a rather long time, are performed according to the following procedure at a place spaced from the production line.

In the same manner as the maintenance operation described above, the machine 4X is allowed to slide forwards along the V-groove rail 8. The caster-equipped cart WDC is set at the same position as the maintenance stand WD shown in FIG. 5, and the machine 4X is drawn out forwards and placed onto the caster-equipped cart WDC. The machine 4X is fixed onto the caster-equipped cart WDC by the fixing means (the fixing bolts 8b and the screw holes 8d). Further, the control device 5, the cutting fluid supply device 6, and the air supply device 7 are also placed onto the caster-equipped cart, and the cable and the piping are connected again. In this way, the production device on the caster-equipped cart completely separated from the production line is carried to another location where it undergoes full maintenance; after the maintenance is completed, the production device is set to the original position by a procedure reverse to the above procedure.

During this maintenance, another set of production device (including the machine 4, the cutting fluid supply device 6, and the air supply device 7) that is adjusted and set up in advance is carried to the original position by another caster-equipped cart to be interchanged with the above production device, so the operation of the production line can be resumed in an extremely short time.

Further, the caster-equipped cart having the production device thus placed thereon may be carried to another location where it is operated as one independent production device to produce a workpiece.

Like the maintenance stand WD of FIG. 5, the caster-equipped cart WDC of FIG. 6 can be used instead of the split base 3 in increasing the number of stations in the production line.

Second Embodiment

[Construction and Operation of Production Line]

FIG. 7 is a plan view showing a second embodiment of the present invention. The second embodiment is different from the first embodiment in the following construction. That is, a machine 4-1 of the first station 2-1 of the production line is equipped with a bar cutting device; a bar member y is supplied along a workpiece principal axis Y from a bar supply device 30 arranged adjacent to the machine 4-1, and the bar cutting device cuts the distal end portion of the bar y to produce a workpiece, which is passed onto the next process. The portions that are the same as those of the first embodiments are denoted by the same reference symbols.

Referring to FIG. 7, reference numerals 4-1 through 4-4 denote the same machines as those denoted by reference numeral 4 in the first embodiment, reference numerals 5-1 through 5-4 denote the same control devices as those denoted by reference numeral 5 in the first embodiment, and reference numerals 11-1 through 11-14 denote the same inter-machine workpiece conveying devices as those denoted by reference numeral 11 in the first embodiment.

In the machine 4-1, cutting is performed on the distal end portion of the bar y that is paid out by a predetermined length from the bar supply device 30, and then the distal end portion of the machined bar is severed by a cutting tool to produce a workpiece. The workpiece thus severed and produced is conveyed to a workpiece delivery position 10b by the internal conveyance device 10 of the machine 4-1. The inter-machine workpiece conveying device 11-1 conveys the workpiece to a workpiece receiving position 10a of the machine 4-1 at the next station.

In the machines 4-1 and 4-3 at the subsequent stations, cutting and grinding are successively performed on the workpiece. The delivery of the workpiece between the stations is performed in the same manner as in the first embodiment.

The machine 4-4 at the fourth station measures the dimensions and configuration of the workpiece that has undergone cutting and grinding in the machines 4-1 through 4-3, and makes a pass/fail judgment by comparing the measured value with a target value. The pass/fail information is sent to the control device 5-4, and based on the pass/fail information from the control device, the fourth inter-machine workpiece conveying device 11-4 directs the workpiece, which is conveyed to the workpiece delivery position 10b of the machine 4-4, into one of a product (conforming article) container 35 and a reject container 36 of a workpiece collection device 34 arranged at a collection station.

The difference between the measured value and the target value is calculated to obtain error data, which is fed back to the production processes at the machines 4-1 through 4-3. In the production processes at the machines 4-1 through 4-3, based on the above error data, a preset command value of a machining program is automatically corrected so that the workpiece to be machined next is machined into the target value. It should be noted that the calculation of the error data may be performed by the respective control devices 5-1 through 5-3 controlling the machines 4-1 through 4-3.

[Maintenance Operation etc.]

When maintenance is to be performed on one of the machines 4-1 through 4-4 (and the workpiece collection device 34) that are positioned and fixed on the base by the positioning/fixing means and arranged in a line, the machine on which maintenance is to be performed is drawn out of the production line according to the following procedure.

The production line is temporarily stopped, and the maintenance stand WD (WDC) is brought to the working aisle forward of the machine and adjusted in height before being disposed in front of the base. The fixing bolts 8b are detached, and the moving means provided between the base and the main body portion is activated to draw out the machine 4X forwards from the production line onto the maintenance stand WD (WDC). The machine is fixed on to the maintenance stand WD (WDC) with the fixing bolts 8b. Then, in the same manner as in the first embodiment, the maintenance operation or the like is performed at the site or by moving the machine 4X to another location together with the maintenance stand WDC.

After the maintenance operation or the like, the machine is returned from the maintenance stand WD (WDC) onto the base while activating the moving means, and is positioned and fixed onto the production line by the positioning/fixing means to await the operation of the production line.

Third Embodiment

Figure 8:
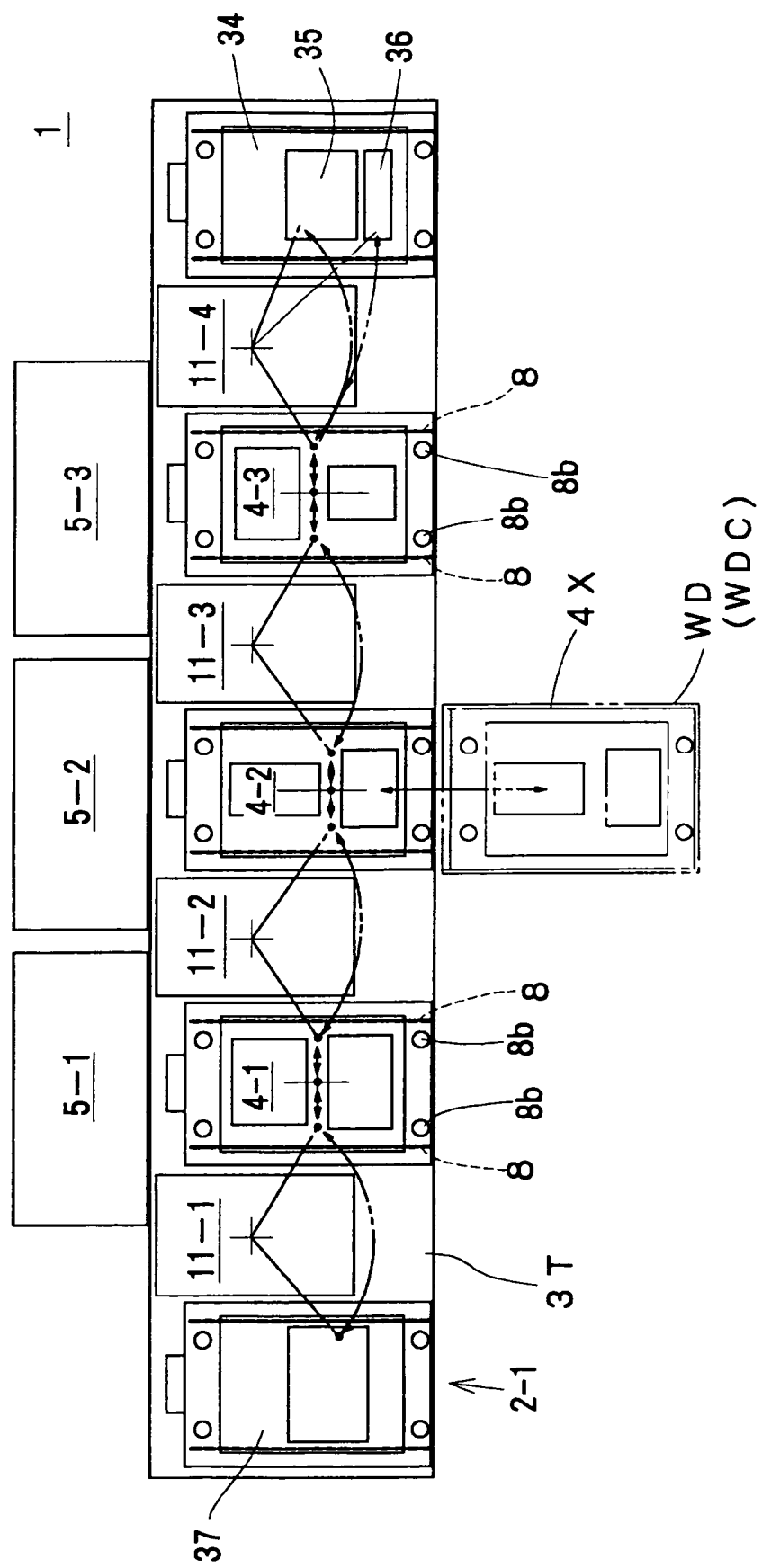
FIG. 8 is a plan view showing a third embodiment of the present invention.

FIG. 8 is a plan view showing a third embodiment of the present invention. The third embodiment is different from the first embodiment in that, instead of using the split bases, the plurality of machines are arranged in a line on one base 3T. On the base 3T, there are provided the plurality of machines 4-1 through 4-3, plural sets of four screw holes 8c for the fixing bolts (which are hidden under the fixing bolts 8b in FIG. 8), the screw holes 8c being arranged corresponding to the arrangement positions of a workpiece supply device 37 and workpiece collection device 34, plural pairs of the V-groove rails 8, and the stoppers 8a. The base 3T is an integrated assembly of plural split bases, and, as a whole, has a rigidity, vibration proof property, and the like sufficient for use as the base of a production device, particularly a machine tool. As in the split base 3, screw holes for the connection means B are bored on either side of the base 3T, thereby allowing connection between plural bases 3T or connection with the split base 3.

The portions that are the same as those of the first and second embodiments are denoted by the same reference symbols and thus detailed description thereof will be omitted.

Referring to FIG. 8, the workpiece supply device 37 is arranged at the first station 2-1 of the production line, and the inter-machine workpiece conveying device 11-1 transports workpieces one by one from the workpiece supply device 37 to be delivered to the first machine 4-1. The workpieces that have undergone machining in the machines 4-1 through 4-3 are directed to either the product container 35 or the reject container 36 of the-workpiece collection device 34 arranged at the collecting station.

The manner in which the machine 4X is moved from the production line onto the maintenance stand WD (WDC) during the maintenance operation or the like is the same as that in the first embodiment.

Fourth Embodiment

Figure 9:
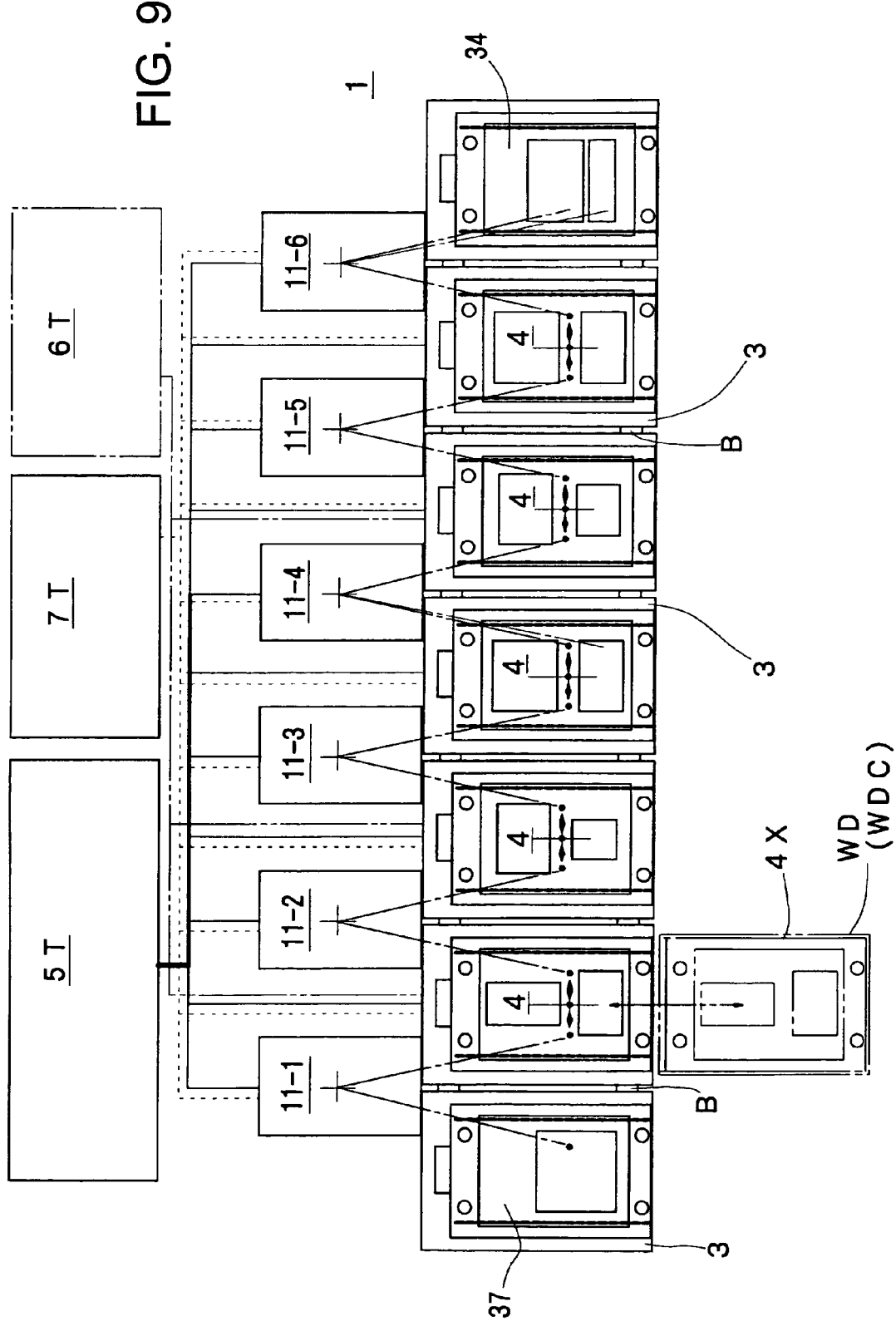
FIG. 9 is a plan view showing a fourth embodiment of the present invention.

FIG. 9 is a plan view showing a fourth embodiment of the present invention. The fourth embodiment is different from the first embodiment in that the control devices and air supply devices or cutting fluid supply devices of the respective machines are combined into a collective-type control device 5T and air supply device 7T or cutting fluid supply device 6T, respectively.

The portions that are the same as those of the first through third embodiments are denoted by the same reference symbols and thus detailed description thereof will be omitted.

Referring to FIG. 9, reference symbols 11-1 through 11-6 denotes the same inter-machine workpiece conveying devices as those denoted by reference numeral 11 in the first embodiment.

Each of the inter-machine workpiece conveying devices 11-1 through 11-6 is arranged in the rear of the machine so that it is not sandwiched between adjacent machines, whereby the spacing between the adjacent machines can be further reduced. As a result, it is possible to achieve a further reduction in total line length.

The manner in which the machine 4X is moved from the production line onto the maintenance stand WD (WDC) during the maintenance operation or the like is the same as that in the first embodiment.

It is needless to mention that in this embodiment, the base 3T of the third embodiment may be used instead of the split bases 3.

Fifth Embodiment

FIG. 10 is a front view showing a fifth embodiment of the present invention. The fifth embodiment is different from the first embodiment in that machines each having a base frame width larger than a standard base frame width WM are incorporated into the production line.

Of the machines of production devices, some can be so wide that the base frame width thereof is more than twice the standard base frame width WM and thus cannot be incorporated into the production line. In such a case, plural split bases are arranged side by side, and a large machine 4W having a large width is placed on the split bases.

Referring to FIG. 10 showing a part of the production line, the large machine 4W having a base frame width LWM is arranged between two machines 4 having the standard base frame width WM. Those machine base portions are placed on plural split bases 3 that are connected to one another by the connecting means B. Each of the machine 4 having the standard base frame width WM is positioned and fixed onto one split base 3 in the same manner as in the first embodiment.

The large machine 4W is positioned and fixed onto two split bases 3. Four machine/movement-guide engaging means A are provided to the bottom portion of the large machine 4W at positions corresponding to four V-groove rails 8 on the two split bases 3. The large machine body 4W is fixed onto the two split bases 3 with the fixing bolts 8b at positions corresponding to the screw holes for the fixing bolts bored at eight locations in total.

A base frame gap S is provided between each machine 4 and the large main body portion 4W having the base frame widths WM and LWM, respectively, with the inter-machine workpiece conveying device (not shown) being arranged in the gap S.

In this embodiment, the base frame width LMW of the large machine 4W is as follows:

$$LWM = WM \times 2 + S \times (2-1)$$

However, as long as the positioning/fixing means and moving means on the machine side can be provided at positions corresponding to the positioning/fixing means and moving means on the split base side, the machine can be incorporated even when its base frame width LWM slightly deviates in value from that obtained by the above expression.

Further, to incorporate, a large machine with an even larger width, it is also possible to arrange more than three split bases side by side and to position and fix the large machine onto the three split bases. When n split bases are used, the base frame width LMN is as follows:

$$LWM = WM \times n + S \times (n-1)$$

In this case as well, the machine can be incorporated even when its base frame width LWM slightly deviates in value from that obtained by the above expression as long as the positioning/fixing means and moving means on the machine side can be provided at positions corresponding to the positioning/fixing means and moving means on the split base side.

While in the above embodiment all of the positioning/fixing means and moving means provided for the machines of the standard base frame width are used as the positioning/fixing means and moving means of the large machine 4W, if the machine 4W has a sufficient rigidity, it is possible to use, for example, only the fixing means and the moving means at the opposite ends.

While in the fifth embodiment the split bases split for each of the stations are used as the base, it is also possible to use the base 3T of the third embodiment. In the base 3T, the positioning/fixing means and moving means for the placement of the machine of the standard base frame width are provided at the position of each station, with the large machine 4W being disposed so as to straddle the positions of the base 3T corresponding to plural stations.

[Another Example of Production Process in the Production Line]

FIGS. 11A, 11B, and 11C are block diagrams respectively showing examples 1a, 1b, and 1c of production lines each employing a production process to which the production line of the present invention is applied. In the example shown in FIG. 11A, a workpiece machined by a production device (production device at a first station) 2A-1 for performing cutting or the like is conveyed to a measurement device (production device at a second station) 2A-2 for the measurement of the dimensions of the machined portion, and if the dimensions measured are within specifications, the workpiece is conveyed to a washing device (production device at a third station) 2A-3 to be washed before being conveyed rightwards for its extraction.

The example shown in FIG. 11B concerns a production line in which the time period required for machining such as cutting is longer than that for the measurement and washing and thus the respective processing time periods are not in balance with each other. In this production line, a workpiece that has been machined by a first production device (production device at a first station) 2B-1 for cutting or the like and a workpiece that has been machined by a production device (production device at a second station) 2B-2 for cutting or the like that is identical to the first production device, are conveyed to a measurement/washing device (production device at a third station) 2B-3 alternately at staggered timings for the measurement of the dimensions of the machined portion, the workpiece being then extracted if the measured dimensions are within specifications.

In the example shown in FIG. 11C, a workpiece that has been machined by a primary production device (production device at a first station) 2C-1 that performs primary machining such as cutting, is conveyed to a secondary production device (production device at a second station) 2C-2 that performs secondary machining such as cutting; after the secondary machining, in the same manner as in FIG. 11A, the workpiece is conveyed to a measurement device (production device at a third station) for the measurement of the dimensions of the machined portion, and if the measured dimensions are within specifications, the workpiece is conveyed to a washing device (production device at a fourth station) to be washed before being conveyed rightwards for its extraction.

Other than the arrangements of FIGS. 11A, 11B, and 11C, it is also possible to change the conveyance direction of the workpiece or to interchange the orders of the washing device and measurement device. Further, the machining process can be organized in an optimum manner as appropriate, such as by performing secondary or tertiary cutting machining after the measurement.

Other Embodiments

In addition to the first through fourth embodiments above, the following modifications may be adopted as other embodiments of the present invention.

Other than providing a split base for each single machine, the base used may be composed of connected plural split bases each having an arbitrary number of plural machines placed thereon, or of a combination of a split base on which plural machines are placed and a split base on which one machine is placed.

The top surface of the base on which the machine is disposed may not necessarily be horizontal; it may be tilted so as to allow, for example, the machine to abut a positioning stopper due to its own weight for automatic positioning.

In addition to delivering a workpiece between adjacent machines, the inter-machine workpiece conveying device may also serve, depending on the arrangement of respective processes, to deliver a workpiece between machines at distant locations from each other. Further, it is also possible to use a collective-type inter-machine workpiece conveying device which delivers a workpiece not only between a pair of machines but also between plural pairs of machines.

As the positioning/fixing means, known positioning means for performing two-dimensional positioning of the machine within the plane of the base top surface, or another detachable base/machine fixing means may be employed.

The moving means used may be another friction-reducing device such as a ball, a roller, a low-friction resin surface, pneumatic levitation, or magnetic levitation. Preferred examples of the moving means include commercially available slide rail, linear-motion rail guide, cam follower, linear guide, linear-motion roller, linear-motion needle, and dovetail guide.

What is claimed is:

1. A production line comprising:

a base;

a plurality of machines that machine a workpiece and are arranged in a line on a machine placing surface of the base;

an inter-machine workpiece conveying device that delivers the work-piece between a workpiece delivery position of one of the machines and a workpiece receiving position of another one of the machines;

positioning/fixing means for positioning and fixing each of the machines in the line onto the machine placing surface of the base, the positioning/fixing means of each of the machines comprising components having a common structure and common dimensions, the components of each of the positioning/fixing means comprising a stopper provided with respect to the movement direction of the respective machine for positioning the respective machine in a longitudinal direction thereof, a plurality of first screw holes provided in the machine placing surface of the base, a plurality of second screw holes provided in the respective machine for alignment with the respective first screw holes when the respective machine is arranged on the machine placing surface of the base, and a plurality of screw bolts for engagement with the respective first and second screw holes to removably fix the respective machine on the machine placing surface of the base; and moving means for facilitating sliding movement of each of the machines along the machine placing surface of the base, the moving means each comprising a movement guide extending along a movement direction of the respective machine and a ball that engages with the respective movement guide to position the respective machine in a lateral direction thereof.

2. A production line according to claim 1; wherein the machines have a common base frame width.

3. A production line according to claim 1; wherein the machines are equally spaced apart from one another.

4. A production line according to claim 1; wherein the moving means of each of the machines comprises components having a common structure and common dimensions.

5. A production line comprising:
a base;
a plurality of machines that machine a workpiece and are arranged in a line on a machine placing surface of the base;
an inter-machine workpiece conveying device that delivers the workpiece between a workpiece delivery position of one of the machines and a workpiece receiving position of another one of the machines;
positioning/fixing means for positioning and fixing each of the machines in the line onto the machine placing surface of the base; and
moving means for facilitating sliding movement of each of the machines along the machine placing surface of the base, the moving means comprising a v-groove rail extending along a movement direction of the respective machine, a ball that engages with the V-groove rail, and a hydropneumatic device for urging the ball toward the V-groove rail to lift the respective machine from the machine placing surface of the base.

6. A production line according to claim 5; wherein the V-groove rail is provided on the base and the ball and the hydropneumatic device are provided on a base frame of the respective machine.

7. A production line comprising:
a base;
a plurality of machines that machine a workpiece and are arranged in a line on a machine placing surface of the base;
an inter-machine workpiece conveying device that delivers the workpiece between a workpiece deliver, position of one of the machines and a workpiece receiving position of another one of the machines;
positioning/fixing means for positioning and fixing each of the machines in the line onto the machine placing surface of the base;
moving means for facilitating sliding movement of each of the machines along the machine placing surface of the base to permit the respective machine to be slidingly drawn off of the machine placing surface of the base; and
a maintenance stand onto which the respective machine slidingly drawn off of the machine placing surface of the base by the moving means is placed, the maintenance stand having a rigidity and vibration-proof property that are equivalent to those of the base, wherein the maintenance stand includes:

a machine placing surface for directly placing thereon the respective machine, which is slidingly drawn off of the machine placing surface of the base, by arranging the machine placing surface of the maintenance stand in contact with the machine placing surface of the base;

height adjusting means for adjusting a leveling and height of the machine placing surface of the maintenance stand;

positioning means for positioning the respective machine on the machine placing surface of the maintenance stand; and fixing means for fixing the positioned respective machine on the machine placing surface of the maintenance stand.

8. A production line according to claim 7; wherein the positioning means of the maintenance stand comprises a fence surrounding the respective machine and provided along three peripheral sides of the machine placing surface of the maintenance stand excluding a machine receiving side thereof.

9. A production line according to claim 7; further comprisifl9 a plurality of control devices each connected to the respective machines through a detachable cable for controlling activation of the respective machine; wherein when the respective machine is slidingly drawn oft of the machine placing surface of the base and placed on the machine placing surface of the maintenance stand, the respective machine and the corresponding control device are connected to each other via an extension cable.

10. A production line according to claim 7; further comprising a plurality of fluid supply devices each connected to the respective machines through detachable piping for supplying a fluid to the respective machine; wherein when the respective machine is slidingly drawn off of the machine placing surface of the base and placed on the machine placing surface of the maintenance stand, the respective machine and the corresponding fluid supply device are connected to each other via a flexible extension tube.

11. A production line according to claim 7; wherein the maintenance stand comprises a caster-equipped cart.

12. A production line according to claim 11; wherein the caster-equipped cart comprises a control device accommodating portion that accommodates a control device for controlling activation of the respective machine.

13. A production line according to claim 11; wherein the caster-equipped cart comprises a fluid supply device accommodating portion that accommodates a fluid supply device for supplying a fluid to the respective machine.

14. A production line according to claim 7; wherein the base comprises a plurality of split bases; and further comprising connecting means for detachably connecting the plurality of split bases to each other and to the maintenance stand.

15. A production line comprising:
a base;
a plurality of machines that machine a workpiece and are arranged in a line on a machine placing surface of the base;
an inter-machine workpiece conveying a device that delivers the workpiece between a. workpiece delivery position of one of the machines and a workpiece receiving position of another one of the machines;
positioning/fixing means for positioning and fixing each of the machines in the line onto the machine placing surface of the base. the positioning/fixing means including fixing means comprising first screw-coupling means for fastening the base and the respective machine to each others;

moving means for facilitating sliding movement of each of the machines along the machine placing surface of the base to permit the respective machine to be slidingly drawn off of the machine placing surface of the base;

a maintenance stand onto which each of the machines slidingly drawn off of the machine placing surface of the base by the moving means is placed, the maintenance stand having the same height as the base; and second screw-coupling means provided between the maintenance stand and the respective machine for screw-coupling the respective machine to the maintenance stand.

16. A production line according to claim 15; wherein the base comprises a plurality of split bases; and further comprising connecting means for detachably connecting the plurality of split bases to each other and to the maintenance stand.

17. A production line according to claim 15; wherein the maintenance stand comprises a caster-equipped cart.

18. A production line comprising:

a plurality of production devices arranged in a line for machining a workpiece by conveyance of the workpiece successively to the production devices, each of the production devices having a machine for machining the workpiece, an individual base for supporting the machine, a mounting unit that removably integrally mounts the machine on a surface of the individual base, and a positioning moving unit hat positions the machine on the surface of the individual base and that facilitates sliding movement of the machine along the surface of the individual base to permit the machine to be slidingly drawn off of the surface of the individual base when the machine is not mounted on the surface of the individual base by the mounting unit; and a maintenance stand onto which the machine slidinglv drawn off of the surface of the individual base is placed for transportation away from the production line and/or for undergoing a maintenance operation;

wherein the positioning/moving unit comprises at least one grooved rail formed on the surface of the individual base, a ball that engages the grooved rail, a hydropneumatic device that urges the ball into engagement with the grooved rail to position the machine on the individual base in a lateral direction of the machine and to permit the machine to be slidingly drawn off of the surface of the individual base in a longitudinal direction of the machine, and a stopper mounted on a base frame of the individual base for positioning the machine in the longitudinal direction of the machine.

* * * * *